United States Patent [19]

Hart et al.

[11] B 3,988,391

[45] Oct. 26, 1976

[54] TRANSPARENT RUBBER-CONTAINING BLEND OF ACRYLONITRILE/AROMATIC OLEFIN RESIN

[75] Inventors: Charles Richard Hart, Hitchin; Eric Nield, Watton-at-Stone, both of England

[73] Assignee: Imperial Chemical Industries Limited, London, England

[22] Filed: May 27, 1975

[21] Appl. No.: 580,826

[44] Published under the second Trial Voluntary Protest Program on February 17, 1976 as document No. B 580,826.

Related U.S. Application Data

[60] Continuation of Ser. No. 444,834, Feb. 22, 1974, abandoned, which is a division of Ser. No. 294,611, Oct. 3, 1972, abandoned.

[30] Foreign Application Priority Data

Oct. 14, 1971  United Kingdom............... 47793/71
Nov. 1, 1971  United Kingdom............... 50637/71

[52] U.S. Cl. .................. 260/876 R; 260/880 R; 260/827; 260/882

[51] Int. Cl.$^2$ .................. C08L 51/00; C08L 53/00
[58] Field of Search ..................... 260/876 R, 880 R

[56] References Cited

FOREIGN PATENTS OR APPLICATIONS

| | | |
|---|---|---|
| 1,185,306 | 3/1970 | United Kingdom............ 260/876 R |
| 1,009,360 | 11/1965 | United Kingdom............ 260/880 R |
| 994,924 | 6/1965 | United Kingdom............ 260/880 R |

*Primary Examiner*—Richard B. Turer
*Attorney, Agent, or Firm*—Cushman, Darby & Cushman

[57] ABSTRACT

A graft copolymer having a diene rubber substrate and a superstrate which is a homogeneous copolymer comprising acrylonitrile and aromatic olefin, the diene rubber substrate and the superstrate having refractive indices differing by less than 0.008 from each other and from that of a homogeneous acrylonitrile/aromatic olefin resin with which the graft copolymer may be subsequently blended, the resin containing units of acrylonitrile within the range 86 to 93 percent molar.

6 Claims, 1 Drawing Figure

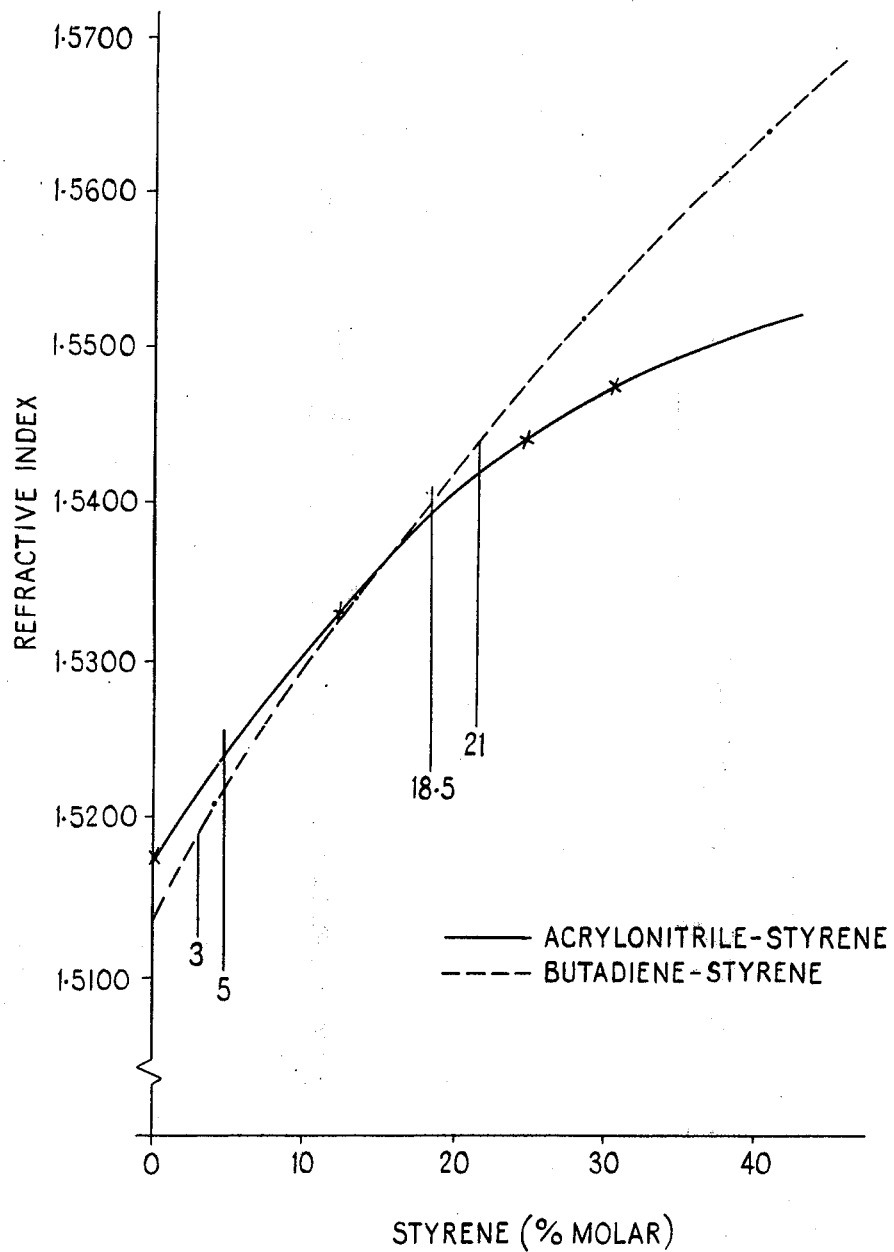

TRANSPARENT RUBBER-CONTAINING BLEND OF ACRYLONITRILE/AROMATIC OLEFIN RESIN

This is a continuation of application Ser. No. 444,834, now abandoned filed Feb. 22, 1974, which in turn is a division of application Ser. No. 294,611, filed Oct. 3, 1972 now abandoned.

This invention relates to graft copolymers and in particular to graft copolymers having a diene rubber substrate.

Homogeneous resins of acrylonitrile and aromatic olefin, in particular styrene have optimum compromise of impermeability and impact strength when the acrylonitrile concentration lies within the range 86 to 93 percent molar. In order to improve the impact strength of the resins, they may be blended with compatible graft copolymers having a diene rubber substrate. Suitable graft copolymers are described in British specifications 1 143 408, 1 185 306, 1 185 307 and 1 204 476. In general, such blends will not be transparent. We have now found that transparent blends can be formed if the graft copolymer has a diene rubber substrate which has essentially the same refractive index as the homogeneous resin and a superstrate having approximately the same composition as the homogeneous resin such that the refractive indices of the resin, substrate and superstrate differ by no more than 0.008.

According to the present invention, a graft copolymer is provided having a diene rubber substrate and a superstrate which is a homogeneous copolymer comprising acrylonitrile and aromatic olefin, the diene rubber substrate and the superstrate having refractive indices differing by less than 0.008 (preferably less than 0.005) from each other and from that of a homogeneous acrylonitrile/aromatic olefin resin with which the graft copolymer may be subsequently blended, the resin containing units of acrylonitrile within the range 86 to 93 percent molar.

The diene rubber contains units from at least one conjugated 1,3-diene monomer and units from other ethylenically unsaturated monomers copolymerisable therewith using free radical catalysts. Suitable dienes include for example butadiene, isoprene, 2,3-dimethylbutadiene, chloroprene and piperylene.

A variety of other monomers may be used, including aralkenes such as styrene and α-methylstyrene. Other monomers such as for example esters of acrylic and methacrylic acids such as methyl, ethyl, n-butyl and 2-ethylhexyl acrylates and methyl and n-butyl methacrylates and esters of fumaric acid, provided that the refractive indices of the rubber, superstrate and resin are in accordance with the invention. The refractive indices of the above dienes and styrene as polymerised units are given below:

| | |
|---|---|
| poly-2,3-dimethylbutadiene | 1.5250 |
| polybutadiene | 1.5148 |
| polyisoprene | 1.5219 |
| polychloroprene | 1.5578 |
| polystyrene | 1.5935 |
| poly(α-methylstyrene) | 1.57 – 1.58 |
| polyacrylonitrile | 1.5180 |
| polymethacrylonitrile | 1.5200 |

By refractive index we mean the refractive index at 25°C using the D-line of sodium ($0.5890 \times 10^{-4}$ μm).

The superstrate of the graft copolymer is a homogeneous copolymer of acrylonitrile and aromatic olefin containing units of acrylonitrile within the range 80 to 93 percent molar (preferably within the range 86 to 93 percent molar), the acrylonitrile content being such that the refractive index of the superstrate differs by less than 0.008 (preferably less than 0.005) from that of the homogeneous acrylontrile/aromatic olefin resin which may be blended with the graft copolymer. The superstrate may also contain a minor molar amount (i.e. less than the molar amount of aromatic olefin) of units of other ethylenically unsaturated compounds copolymerisable therewith using free radical catalysts. The aromatic olefin is selected from those of the formula CH$_2$:CR.Ar and also acenaphthylene, indene and coumarone. In this formula R is hydrogen or methyl and Ar is an optionally ring-substituted residue of aromatic character having not more than 3 rings and each substituent (if any) having not more than 4 carbon atoms. Examples of such olefins include styrene, α-methylstyrene, o-methylstyrene, m-methylstyrene, p-methylstyrene, m-vinylphenol, p-trimethylsilylstyrene, 2,5-dimethylstyrene, p-methoxystyrene, 1-vinyl naphthalene, p-dimethylaminostyrene, p-acetamidostyrene, ar-dibromostyrene, 2-vinylthiophene, 3-vinylphenanthrene, N-vinylcarbazole and 2-methyl-5-vinyl-pyridine. Preferred aromatic olefines are styrene and α-methylstyrene.

A preferred graft copolymer is one having a butadiene/styrene substrate and a superstrate which is a homogeneous copolymer of acrylonitrile and styrene in which the concentration of acrylonitrile is within the range 86 to 93 percent molar. This graft copolymer may be blended with a homogeneous acrylonitrile/styrene resin having composition essentially the same as the superstrate. The variation of refractive index with increasing styrene content copolymerised with acrylonitrile and butadiene is presented in the accompanying drawing and the table of which the figures for butadiene/styrene are taken from Synthetic Rubber, John Wiley, New York, 1954. A homogeneous resin of acrylonitrile and styrene having acrylonitrile content within the range 86 to 93 percent molar has a refractive index of 1.536 to 1.527. The substrate of the graft copolymer according to the invention should have refractive index 1.544 to 1.519 (preferably 1.541 to 1.522) which corresponds to a styrene concentration in the substrate of 3 to 21 percent molar (preferably 18.5 to 5 percent molar). Similar drawings may be derived for other substrates and homogeneous resins.

| Butadiene/styrene Copolymer Styrene (% molar) | Refractive Index (at 25°C) |
|---|---|
| 0 | 1.5154 |
| 4.8 | 1.5222 |
| 13.5 | 1.5346 |
| 13.8 | 1.5350 |
| 28.0 | 1.5523 |
| 39.5 | 1.5654 |
| Acrylonitrile/styrene Homogeneous copolymer Styrene (% molar) | Refractive Index (at 25°C) |
| 0 | 1.5180 |
| 12.5 | 1.5340 |
| 17.6 | 1.5390 |
| 25 | 1.5450 |
| 31 | 1.5485 |

The graft copolymers of the invention may be made by any of the methods described in British specification 1 185 306. The graft copolymers may be blended with homogeneous acrylonitrile/aromatic olefin resin by any method known for blending thermoplastic materials.

The homogeneous acrylontrile/aromatic olefin resin may be made by any suitable means. British patent specification No. 663 268 describes a method of doing this, in which acrylonitrile and styrene or α-methylstyrene are added to an aqueous medium at the reflux temperature, the aqueous medium containing a water-soluble peroxy catalyst and a dispersing agent, and the rates of addition being such as to maintain a substantially constant reflux temperature in the aqueous medium. Another convenient method is to measure the heat of polymerisation during the reaction by isothermal calorimetry and add at least monomer pro rata as heat is produced, as described in British patent specification 1 197 721. The resin may be a blend of resins each having acrylonitrile concentration within the range 80 to 95 percent molar, provided that the average acrylonitrile concentration is within the range 86 to 93 percent molar and the refractive indices of all the resins are within a 0.008 range.

When both the "graft" and the resin required for blending are available as latices (e.g. as the products of an aqueous emulsion polymerisation), the components need not be isolated but the latices can be mixed, i.e. the "graft" and the resin are latex blended. After adding any required additives, e.g. stabilisers and antioxidants, the blend is then coagulated by pouring into a dilute electrolyte solution, e.g. aluminium sulphate or calcium chloride solution, and the product isolated and washed with hot water.

Alternatively the two components may be melt-blended on a mill having heated rollers, or in an extruder.

A blend may also be obtained directly in a simple polymerisation reaction by adjusting the conditions of the "grafting" polymerisation so that some of the superstrate monomers copolymerise to give some separate resin as well as the "graft"; thus the "graft" is produced concurrently together with the resin.

The toughness of the final blended composition is governed not only by the amount of rubber it contains (preferably 1 to 50 percent by weight) but also by the proportion of superstrate in the "graft" used for blending. Blends which are particularly preferred are those containing 5 to 35 percent by weight of rubber.

The "grafts" or their blends, mixed with any desired fillers or reinforcing materials, lubricants and stabilisers, can be used as thermoplastic raw material to make articles which require a good resistance to impact. Their toughness, low permeability to gases and vapour, transparency coupled with high strength and high softening point may thus be displayed to advantage. For example, the compositions may be extruded into sheet or tube, and the sheet can be calendered with embossing if desired or can be shaped as required e.g. by pressing, drawing or vacuum-forming. The compositions can also be compression-moulded, blow-moulded and injection-moulded. Examples of articles that may thus be produced using the compositions of the invention include panelling and exterior casing for machinery (as in motor cars, office machines and household equipment), crash helmets, bottles and pipes for conveying liquids and fluids, and telephone receivers. A particular use of the blends is as a packaging material for, for example, foodstuffs, (e.g. wine, beer, carbonated drinks) medicines and as an aerosol package. The blends may be used as laminates to plastics and other materials. Latices of the blends may be used directly as coatings, particularly barrier coatings on for example paper. The use of compositions of the invention having superior tensile strength coupled with toughness and rigidity may allow economy of material in comparison with currently used products in that thinner pieces would serve the same purpose. The advantageous physical properties of the compositions may also permit them to be used in engineering applications for which plastics have not hitherto been suitable.

The invention is illustrated by the following examples.

EXAMPLE 1

A graft copolymer was prepared by a method similar to that described in Example 4 of British specification 1 185 306 by copolymerising acrylonitrile and styrene in the presence of a preformed diene rubber latex. The diene rubber latex contained 20.5 percent solids and the diene rubber made from butadiene (88 percent molar) and styrene (12 percent molar) had a refractive index 1.533. A graft copolymer, having a superstrate containing randomly copolymerised acrylonitrile (87.5 percent molar) and styrene (12.5 percent molar) was made from an initial charge consisting of the above diene rubber latex (12.65 kg), styrene (33.5 g), acrylonitrile (2.61 kg). The procedure of Example 4 of British specification 1 185 306 was followed, but using dextrose (77 g); cumene hydroperoxide (56 g); ferrous sulphate (3.8 g) sodium pyrophosphate (19 g). The rate of polymerisation was followed by calorimetry and styrene was fed to the reaction mixture so that the ratio of acrylonitrile to styrene in the mixture maintained its initial value. A solution of "Nansa" HS 85/S (Marchon Ltd. Trade Mark) (25 g in 200 cm$^3$ of water) was fed to the reaction mixture during the reaction. The reaction was terminated by adding 2,6-ditertiary-butyl-4-methyl phenol (259 g as 30 percent dispersion in water). The latex of the resulting graft copolymer contained 25.5 percent solids representing a conversion on solids of 91 percent; the rubber content of the graft was 48 percent.

The above graft copolymer was latex blended with an acrylonitrile/styrene resin prepared by the method described in British specification 1 185 305 but containing 87.5 percent molar acrylonitrile (refractive index 1.534) to give a blend containing 10 percent by weight of rubber. The latices were coagulated using aqueous magnesium sulphate (1% w/v), the coagulate being filtered, washed with water and dried in a vacuum oven at 70°C. Similar blends containing 6 and 8 percent by weight of rubber were prepared by melt blending graft copolymer with resin. Bottles were made from samples of each blend on blow-moulding equipment manufactured by Bekum GmbH, Berlin, model BOA3. The temperature of the melt within the Bekum BOA3 varied from 180° to 185°C at the hopper to about 200°C at the die with a mould temperature of 60°C. The bottles had a capacity of 330 cm$^3$ and weighed about 30 g. The bottles and plaques were transparent and results of physical testing are presented in the following table. In the notched impact strength test, carried out at 20°C, a plaque 51 mm long, 6.3 mm wide, and 3 mm thick was moulded at 200°C from a blend and was given a 45° notch 2.8 mm deep (tip radius 0.25 mm) in the centre of one edge. It was supported between two supports 38 mm apart and struck centrally on the edge opposite the notch by a pendulum dropping from 305 mm with more than sufficient energy to break the specimen. From the residual energy of the pendulum, the energy required to break the specimen was calculated and divided by the cross-sectional area of the specimen at the notch. The resulting value (expressed in $kJ/m^2$) represents the energy required to break the material.

Samples of the blends were compression-moulded at 200°C to give films about 200 μm thick and evaluated for permeability to oxygen and carbon dioxide.

Permeability was measured according to the pressure differential method of N T Notley which was described in Journal of Applied Chemistry 1963 Volume 13, Page 107. The measurements were made using essentially dry gases at 30°C using a pressure differential of 1 atmosphere.

| | Rubber Content (%) | | | |
|---|---|---|---|---|
| | 0 | 6 | 8 | 10 |
| Bottle Drop Height (cm) | 30.5 | 76.0 | 223 | 378 |
| Permeability ($\times 10^{-19}$ mole $ms^{-1}N^{-1}$) | | | | |
| Oxygen | 9 | 11 | — | 13 |
| Carbon Dioxode | not detected | 20 | — | 20 |
| Impact Strength (notched $kJ/m^2$) | 1.73 | 2.2 | 3.1 | 9.7 |

The results show that blending of a graft copolymer having a diene rubber substrate with a homogeneous copolymer of acrylonitrile and styrene produced a composition having improved impact strength (and bottle drop height) and marginally inferior permeability to the homogeneous copolymer. A similar result was obtained using a graft copolymer having a polybutadiene substrate (refractive index 1.5154), in respect of a blend containing 10 percent by weight of rubber although the composition was translucent.

EXAMPLE 2

The procedure for preparing the graft copolymer of Example 1 was repeated except that "Nansa" HS 85/S was added to the butadiene/styrene rubber latex during polymerisation of the butadiene and styrene. The diene rubber latex contained 25.1 percent solids and the diene rubber butadiene (88 percent molar) and styrene (12 percent molar). Blends of the acrylonitrile/styrene resin of Example 1 containing 87.5 percent molar acrylonitrile and the graft copolymer made from the above latex were prepared by the latex blending method of Example 1 but containing 10 and 15 percent by weight of rubber. Transparent plaques and bottles were prepared from the blends. That containing 10 percent by weight of rubber had a notched impact strength of 11.97 $kJ/m^2$; that containing 15 percent by weight of rubber had notched impact strength of 30.35 $kJ/m^2$ and permeability to oxygen and carbon dioxide of $2.0 \times 10^{-18}$ and $3.0 \times 10^{-18}$ mole $ms^{-1}N^{-1}$ respectively.

A similar blend containing 10 percent by weight of rubber but having a substrate of a butadiene homopolymer was opaque and had a notched impact strength of 3 $kJ/m^2$.

EXAMPLE 3

The method of Example 1 was repeated except that the graft copolymer was latex blended with an acrylonitrile/styrene resin containing 89 percent molar of units from acrylonitrile. The graft copolymer latex contained 21.4 percent solids and had a rubber content of 52.9 percent by weight. The resin had a reduced viscosity of 0.90 as measured at 25°C on a solution of polymer in dimethyl formamide containing 1 g of polymer in 100 $cm^3$ of solution and had a refractive index of 1.532. The blend contained 12 percent by weight of rubber. Bottles, made by the method described in Example 1 had a drop height of 150 cm, and a film compression-moulded at 200°C and having thickness 200 μm had an oxygen permeability of $0.9 \times 10^{-18}$ mole $ms^{-1}N^{-1}$. Both the bottle and the film were transparent.

EXAMPLE 4

A series of blends containing 10 percent by weight of rubber were prepared as described in Example 1 except that the acrylonitrile content of the superstrate was varied. The notched impact strength and appearance of compression-mouldings prepared at 200°C are presented in the table below.

| Acrylonitrile in superstrate (% molar) | Superstrate Refractive Index | % Rubber in graft | Impact strength $kJ/m^2$ | Appearance |
|---|---|---|---|---|
| 75 | 1.545 | 47 | 19 | Hazy |
| 80 | 1.541 | 49 | 17 | Transparent |
| 85 | 1.536 | 54 | 22 | Transparent |
| 87.5 | 1.534 | 52 | 7 | Transparent |

EXAMPLE 5

A series of blends were prepared as described in Example 1 except that the styrene content of the rubber was varied. Compression-mouldings prepared at 200°C from blends based on rubbers containing 14, 15 and 16 percent molar styrene (rubber refractive indices 1.535, 1.536 and 1.537 respectively) were all transparent.

EXAMPLE 6

A series of blends containing 10 percent by weight of rubber were prepared as described in Example 1 except that the particle size of the diene rubber in the grafting latex was varied. Results of notched impact tests carried out on compression-mouldings of blend samples prepared at 200°C and details of the rubbers are given in the table below.

| Rubber particle size (μm) | Rubber in graft (% by wt) | Impact strength $kJ/m^2$ | Appearance of blend moulding |
|---|---|---|---|
| 0.03 | 48 | 4.2 | Transparent |
| 0.075 | 51 | 10 | Transparent |
| 0.11 – 0.25 | 45 | 2.9 | Transparent |
| 0.25 | 51 | 1.9 | Transparent |

We claim:

1. A blend suitable for making transparent molded articles having good impact resistance, which comprises (1) a graft copolymer having a substrate of a diene rubber having a refractive index in the range 1.544 to 1.519 and a superstrate which is a homogeneous copolymer comprising acrylonitrile and aromatic olefin containing units of acrylonitrile within the range 80 to 93 percent molar, and (2) a homogeneous acrylonitrile/ aromatic olefin resin containing units of acrylonitrile within the range 86 to 93 percent molar, the blend containing 1 to 50 percent by weight of rubber based on the weight of the blend, the resin having a refractive index at least 0.002 unit lower than that of a homogeneous copolymer of acrylonitrile and said aromatic olefin resin of the same acrylonitrile content as the superstrate, and the resin and the diene rubber used for the substrate having refractive indices differing from each other and from that of a homogeneous acrylonitrile/aromatic olefin resin of the same acrylonitrile content of the superstrate by not more than 0.008.

2. A blend according to claim 1 in which said refractive indices differ by less than 0.005.

3. A blend according to claim 1 in which the diene rubber substrate is a copolymer of butadiene and styrene.

4. A blend according to claim 1 in which the aromatic olefine is selected from styrene and/or α-methylstyrene.

5. A blend according to claim 4 in the form of a shaped article.

6. A blend according to claim 5 in which the shaped article is a bottle.

* * * * *